United States Patent
Russell et al.

(10) Patent No.: US 7,529,645 B2
(45) Date of Patent: *May 5, 2009

(54) MULTIFACETED SYSTEM CAPABILITIES ANALYSIS

(75) Inventors: Richard Gains Russell, Sammamish, WA (US); Mark Lee Kenworthy, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 50 days.

This patent is subject to a terminal disclaimer.

(21) Appl. No.: 11/558,618

(22) Filed: Nov. 10, 2006

(65) Prior Publication Data

US 2007/0088739 A1    Apr. 19, 2007

Related U.S. Application Data

(63) Continuation of application No. 11/112,324, filed on Apr. 22, 2005, now Pat. No. 7,184,934, which is a continuation-in-part of application No. 10/609,187, filed on Jun. 26, 2003, now Pat. No. 7,231,322.

(51) Int. Cl.
    *G06F 15/00* (2006.01)
(52) U.S. Cl. .............................. 702/186; 705/10; 706/6; 709/222
(58) Field of Classification Search ................. 702/122, 702/123, 182, 186; 700/18, 92; 705/10, 705/14, 36; 717/174; 726/25; 706/6; 709/222
See application file for complete search history.

(56) References Cited

U.S. PATENT DOCUMENTS

| 7,184,934 | B2 * | 2/2007 | Russell et al. ............... 702/186 |
| 2003/0084010 | A1 | 5/2003 | Bigus et al. .................... 706/6 |
| 2004/0230469 | A1 | 11/2004 | Christopherson et al. ..... 705/10 |
| 2004/0268341 | A1 | 12/2004 | Kenworthy .................. 717/174 |
| 2006/0026270 | A1 * | 2/2006 | Sadovsky et al. ........... 709/222 |

FOREIGN PATENT DOCUMENTS

| EP | 1 096 406 | 5/2001 |
| GB | 2 355 821 | 5/2001 |

OTHER PUBLICATIONS

Becker, "Will that game work on your PC?," *CNET News.com*, 2005, 2 pages [downloaded from the World Wide Web on Jun 24, 2005].
Futuremark Corp., "Futuremark Corporation releases 3DMark™ 99 max," 1999, 2 pages [downloaded from the World Wide Web on Sep. 14, 2005].

(Continued)

*Primary Examiner*—John H Le
(74) *Attorney, Agent, or Firm*—Woodcock Washburn LLP (57) ABSTRACT

Methods and systems for obtaining the performance characteristics of a computing product are described. Obtaining a computing product's attributes, capabilities, and features includes assessing the computing product to determine the product's attributes, capabilities, and features. Once the assessment is completed, the assessment data is recorded and stored for future applications. The assessments can be performed by the operating system through an assessment tool. Assessments can be performed on various computing products including personal computers, computer components, clusters of computers, and servers.

12 Claims, 6 Drawing Sheets

OTHER PUBLICATIONS

Futuremark Corp., "EA's Westwood Studios teams with NVIDIA and MadOnion.com™," 2001, 2 pages [downloaded with the World Wide Web on Sep. 14, 2005].
Futuremark Corp., "MadOnion.com™ releases 3DMark® 2001," 2001, 3 pages [downloaded from the World Wide Web on Sep. 14, 2005].
Futuremark Corp., "BAPCo® debuts SYSmark® 2001," 2001, 3 pages [downloaded from the World Wide Web on Sep. 14, 2005].
Futuremark Corp., "MadOnion.com™'s performance analyzer revolutionizes online shopping for PCs and components," 2001, downloaded from the World Wide Web on Sep. 14, 2005.
Futuremark Corp., "MAdOnion,com™ powers NVIDIA's and VisionTek's web sites," 2001, 2 pages [downloaded from the World Wide Web on Sep. 14, 2005].
Futuremark Corp., "MadOnion.com™ releases 3DMark® 2001 second edition," 2002, 2 pages [downloaded from the World Wide Web on Sep. 14, 2005].
Futuremark Corp., "MadOnion.com™'s PCMark2002 to revolutionize benchmarking of PCs with a single, cross-platform tool," 2002, 2 pages [downloaded from the World Wide Web on Sep. 14, 2005].
Futuremark Corp., "3DMark® 03 released," 2003, 2 pages [downloaded from the World Wide Web on Sep. 14, 2005].
Futuremark Corp., "Futuremark® service deployed for Windows XP game advisor," 2003, 2 pages [downloaded from the World Wide Web on Sep. 14, 2005].
Futuremark Corp., "Microsoft windows game advisor 3.0 launches," 2005, 2 pages [downloaded from the World Wide Web on Sep. 14, 2005].
Futuremark Corp., " Online servies: performance analyzer—FQA," 2005, 2 pages [downloaded from the World Wide Web on Sep. 14, 2005].
Futuremark Corp., "Online services: performance analyzer—performance analyzer service description," undated, 2 pages [downloaded from the World Wide Web on Sep. 14, 2005].
Futuremark Corp., "Online services: performance analyzer," undated, 2 pages [downloaded from the World Wide Web on Sep. 14, 2005].
International Organzation for Standardization, "Stages of the development of international standards," 2003, 3 pages [downloaded from the World Wide Web on May 25, 2003].
International Organization for Standardization, "How are ISO standards developed?" 2002, 2 pages [downloaded from the World Wide Web on May 25, 2003].
MacSpeedZone, "MacBench 4.0 documentation," 1999-2003, 25 pages, [downloaded from the World Wide Web on May 29, 2003].
Mäkinen, et al., "A detailed process assessment for software SMEs," *EuroSPI 2000*, 2000, 11 pages [downloaded from the World Wide Web on May 25, 2003].
Microsoft Corporation, "Multimedia PC level 1 and level 2 specifications," *Microsoft Knowledge Base Article 106055*, 1999, 5 pages, [downloaded from the World Wide Web on May 25, 2003].
Microsoft Corporation, "Software 'Designed for Windows XP,'" 2002, 1 page, [downloaded from the World Wide Web on May 26, 2003.
Microsoft Corporation, "Software technical requirements," 2002, 1 page [downloaded from the World Wide Web on May 26, 2003.
Microsoft Corporation,"Windows logo program: 'Designed for Windows XP' application specification, Version 2.3," 2002, 1-10.
Microsoft Corp., "Windows game advisor," 2005, 3 pages [downloaded from the World Wide Web on Sep. 14, 2005].
Monroe, "How to buy software for Windows 95/98," 1998-1999, 3 pages.
PC Certify, Inc., "InfoSpotter SnapShot (System Discovery Engine)," 1999-2003, 5 pages [downloaded from the World Wide Web on May 23, 2003].
PC Certify Inc., "PC certify testing log," www.pccertify.com/downloads/pdf/samlpe_Burn-in-log.pdf, 2000, 11 pages [downloaded from the World Wide Web on May 25, 2003].
Senftleben, "The notebook/2site," 1998, 2 pages [downloaded from the World Wide Web on May 23, 2003].
Senftleben, "The notebook/2 site: How to use this site to make a buying decision," 1998, 2 pages [downloaded from the World Wide Web on May 25, 2003].
SiSoftware, Ltd., "SiSoftware Sandra legacy re-released," 2004, 2 pages [downloaded from the World Wide Web on Jun. 24, 2005].
Smith, N., "3DMark2001," undated, 2 pages [downloaded from the World Wide Web on Sep. 14, 2005].
Zwlwietro, "Technology: MPC standards," 1996, 3 pages [downloaded from the World Wide Web on Sep. 14, 2005].

* cited by examiner

MULTIFACETED SYSTEM CAPABILITIES ANALYSIS

REFERENCE TO CO-PENDING APPLICATIONS

This application is a continuation application of and claims priority to U.S. application Ser. No. 11/112,324, filed Apr. 22, 2005, entitled "Multifaceted System Capabilities Analysis," which is a continuation-in-part of application Ser. No. 10/609,187 filed on Jun. 26, 2003, entitled "Hardware/Software Compatibility Rating System," which are hereby incorporated by reference in their entirety.

FIELD OF THE INVENTION

The present invention relates generally to determining the characteristics of computing products, and more particularly, to assessing computer products to determine their performance characteristics.

BACKGROUND OF THE INVENTION

Determination of a computer system's performance characteristics including its attributes, capabilities, and features can be a complicated task. Because software, including but not limited to, applications, middleware, operating systems, drivers, and software components vary in their sensitivity to various attributes, capabilities, and features of the underlying computer system, knowing such information can be useful in selecting software. For example, some software may scale better on systems with more computational power—often called CPU or processor performance. Other software may be more dependent on the performance of the graphics and video sub-system or the storage sub-system, for example. Thus, knowing the system's attributes, capabilities, and features is invaluable when selecting new software.

Consumers often purchase computer systems based on the computer system's ability to run a particular piece of software or class of software. Thus, the need to understand computer system performance as it relates to how well a system will run software is an important task. There are many characteristics of a computer system that can affect the performance and operation of software. Characterizing these performance characteristics is typically the function of applications called "benchmarks" which are intended to measure performance of a computer system.

While benchmarks are useful, they often are (1) hard to use, (2) not integrated within an operating system product or platform, and (3) not readily available to those needing to evaluate computer performance. Since they are not built into or provided with an operating system platform, they cannot be used by software to make static or dynamic operational or configuration decisions based on the computer system's attributes, capabilities, and features.

In view of the foregoing, there is a need for systems and methods that overcome the limitations and drawbacks of the prior art.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

Determination of a computer product's performance characteristics can be accomplished by determining the computer product's attributes, capabilities, and features. A computer product's attributes can be determined through a query of the computing product and recorded for comparison. Further, an inventory of the computer product (or computer hardware component) can be performed, yielding a set of features. The inventory can include an inventory of product's components and features of the components. The computer product's capability can be tested, yielding capability results for a set of attributes or features.

The determination of the attributes, capabilities, and features of the computer product can be accomplished through the use of an assessment tool. An exemplary assessment tool can be part of the operating system platform. The assessment tool can gather information (e.g., the computer system's attributes, capabilities, and features) desirable for people or software itself to make decisions, comparisons, and judgments with respect to how well a computer system will run software. Such decisions, comparisons, and judgments can be made statically (e.g., once) or dynamically (that is, as a system is running). The assessment tool can also be a software program downloaded and/or stored for execution locally or run from a remote computer via a web or network interface, for example.

An example assessment tool is not solely for use with individual computer products. The assessment tool can also be used to assess a cluster of computing products, for example, a cluster of computers, to determine its performance characteristics based on its attributes, capabilities, and features. Further, the assessment tool can be used in assess servers, for example.

Once the data is obtained through the use of an assessment tool, the data can be recorded and stored. The stored data can be used at later times to assess whether the particular computing device is compatible with, for example, a piece of software. For example, the data may be accessed directly by a piece of software when a user attempts to load the software onto the computing device. The data can also be accessed through an interface by the user, for example, through the control panel of the operating system. The data may also be accessed by other systems or entities via a network connection or other communication mechanism.

To make decisions simple, especially for users not well versed in highly technical details, such assessment data could also be aggregated into a more simple form. Such aggregation could occur via many methods including averaging and using a decision tree or matrix. Further, the assessment data may be used to rate a computer product based on its performance characteristics. Such rating may result in the computing product receiving a rating or score based on its perceived performance characteristic.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Systems and methods for assessing a computing product's performance characteristics, including its attributes, capabilities, and features are described. The assessment data is determined and stored so that users or software applications can make decisions with respect to how well a computer product will run or perform an application. Further, the assessment data can be used to pre-populate new computing products. The assessment data can also be used to determine a performance characteristic rating.

The assessment tool can measure, assess, and enumerate—statically or dynamically—a plurality of attributes for computer system components, the system as a whole, or for other computing products including computer system clusters, and servers, for example. An attribute may be defined as an inherent system characteristic, or the degree to which a system adheres to a standard. Attributes often contribute directly to the ability of a system to effectively run a particular piece of software or a class of software. Further, attributes strongly influence system purchasing and configuration decisions. Attributes are also things that are generally measured, in contrast to being detected or enumerated. Attributes cannot be determined before a system is assembled and configured as it is intended to be operated. Attributes are often expressed as (1) a matter of degree or a point on a continuum, (2) a measure of quality, (3) a degree of, or measure of, conformance to a standard or common practice, or (4) a unit of measure (e.g., inches, bytes per second, frequency, operations per second, average CPU utilization, megabytes, bit width), for example. Performance is a commonly measured and expressed attribute. It is a key attribute of many Microsoft Windows PC system components including the processor, graphics and video sub-system, and a storage sub-system.

Assessment of the attributes may include, but is not limited to, the storage components such hard drives, optical drives, or nonvolatile memory, a systems microprocessor or microprocessors and sub-components including but not limited to caches, integer unit, and floating point unit, a systems main memory (i.e., the RAM), and the video and graphics sub-system (i.e., the graphics card, UMA, or embedded graphics).

An exemplary assessment tool can desirably measure, assess and enumerate—statically or dynamically—a plurality of capabilities of computer system components, the system as a whole, or other computing products including computer system clusters, and servers, for example. A capability is a product or system's ability to effectively perform a specific function or task or class of functions or tasks. Capabilities are often present or absent but can also be present to some matter of degree, measure, or metric. To be present, a capability requires: (1) a specified (or minimum) level of one or more attributes, (2) the presence of one or more specified features, and (3) a directly measured or detected ability or expression of a specific function or task or class of functions or tasks.

An assessment of the computing product's capabilities may include, but are not limited to determining whether the computing product has the ability to play different types of videos, the ability to connect to the internet, the ability to provide user interface elements with various levels of detail and sophistication, and the ability to run specific software or classes of software (including but not limited to games, multimedia applications, data analysis software, CAD software, operating system components, middleware, and drivers).

Further, an assessment tool can desirably detect or enumerate features of computer system components, the system as a whole, or other computing products including computer system clusters, and servers, for example. A feature is generally a prominent or distinctive system part, component, or characteristic. Features are either present or absent. Features are not measured like attributes, they are detected or enumerated. Examples of features include, but are not limited to (1) USB 2.0, (2) Hyper Threading technology, (3) AMD64, (4) 1394, (5) dual channel DDR 400 memory, (6) Card Bus, (7) AMD PowerNow! technology, (8) Intel Speed Step technology, (9) ACPI 2.0, (10) memory size of at least 512 MB, (11) video memory size at least 128 MB, (12) UMA Graphics, (13) DVD player or recorder, (14) 2.0 Shader Support, (15) MMX, SSE1, SSE2, KNI, 3DNow, and (16) support for 1024×768 screen resolution.

In some embodiments, an assessment tool may be part of the operating system. An operating system may be defined as the foundation software of a computer system responsible for controlling the execution of programs and providing the necessary services to do so. An operating system may, for example, schedules tasks, allocate storage, handle the interface to peripheral hardware, and present a default interface to the user when no application program is running. The operating system may also, for example, oversee the basic hardware resources of a computer such as disks, memory devices, the keyboard, the screen, and CPU time. For example, an operating system running on a PC includes an assessment tool of the present invention which directs the assessment of the computing product in order to determine its performance characteristics. The assessment tool also can update assessment data for the computing product when, for example, the computing product is upgraded. Other triggers for the assessment tool to initiate a new assessment can include when (1) a new piece of software is downloaded/loaded onto the computing system, (2) the operating system detects a new piece of hardware or software, and (3) the user requests a new assessment to be performed. The assessment results can be viewed by the user through an interface or tool in the control panel of the operating system, for example.

Once the data is obtained through the use of the assessment tool, the data can be recorded and stored. The data can be used collectively or individually by the operating system, software or a person in order to aid in making decisions or judgments with respect to for example: (1) what software can be effectively or correctly installed on a system, (2) how the operating system should configure itself (e.g., should some features be turned on or off based on the capability of the system to effectively operate), (3) how to judge the relative or absolute performance, features, and capability of a system component or the system as a whole versus other components or systems, (4) how the hardware can or should be changed to modify the capability or performance of the system as measured and expressed in terms of the discrete data produced from the assessments or the aggregated or transformed data produced by the policy engine from the discrete data, and (5) input into a capability rating system (CRS) for assigning of a rating to the computing product.

Exemplary Computing Environment

Figure 1:
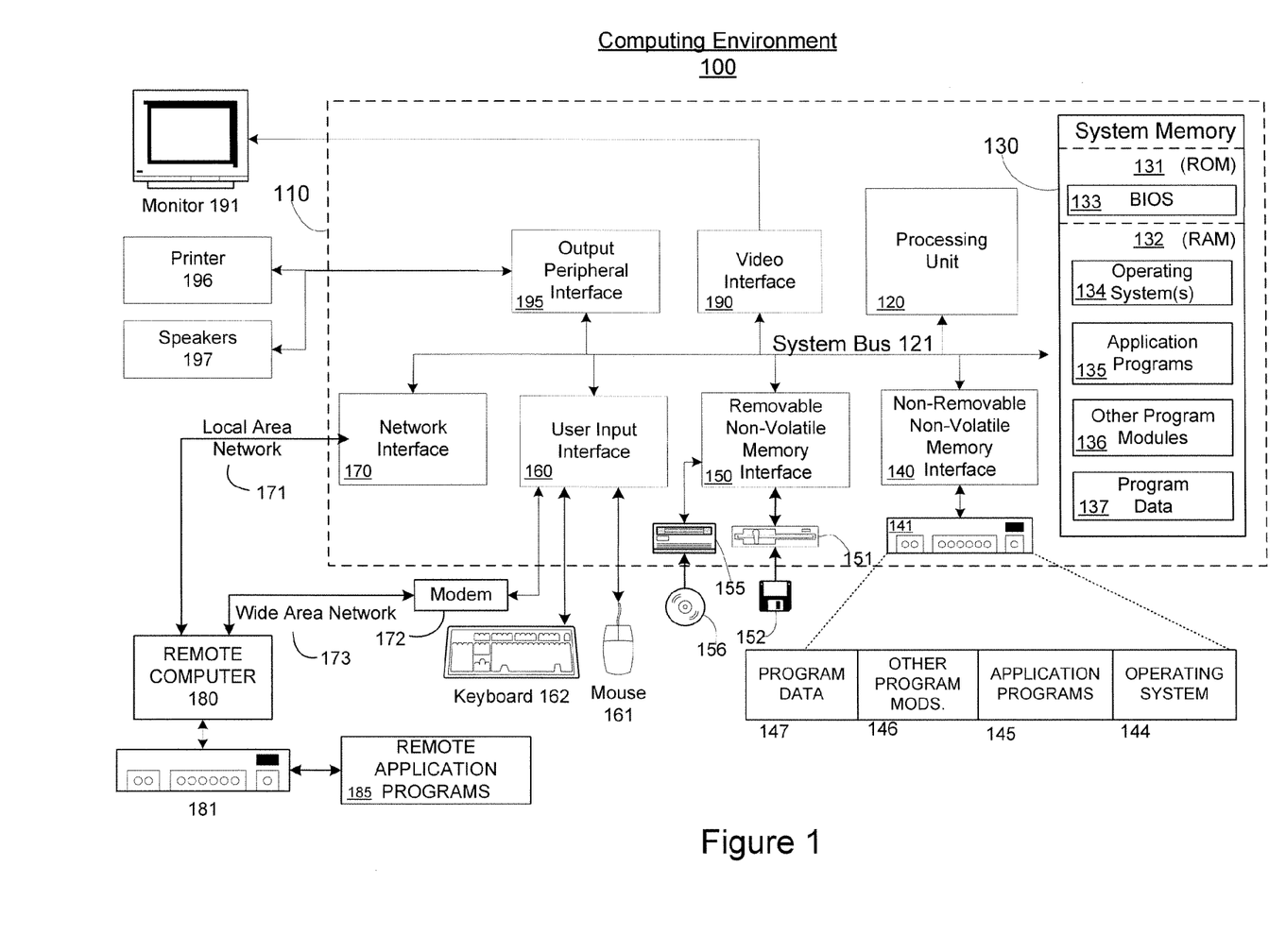
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface (wired or wireless) or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments

Figure 2:
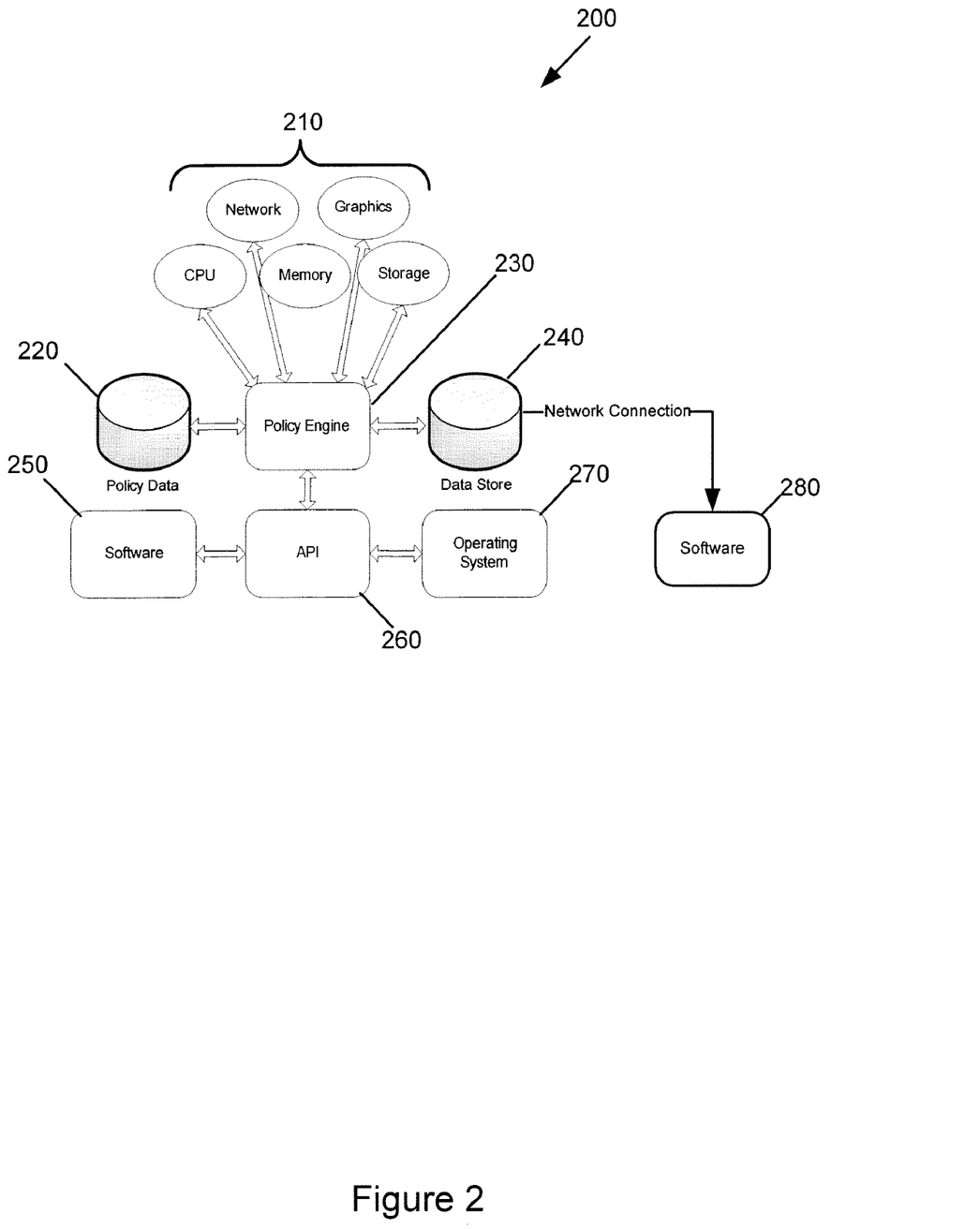
FIG. 2 is a block diagram of an exemplary computing environment that may be used for obtaining data for determining a computer system's attributes, capabilities, and features in accordance with the present invention.

FIG. 2 is a block diagram of an exemplary computing environment 200 using an assessment tool to obtain data for determination of a computer system's attributes, capabilities, and features in accordance with the present invention. The policy data 220 stores the information used by the policy engine 230 to make decisions on when and how to run the assessments 210 of the computing product. The assessments 210 may be run, for example, at predefined times, on demand by a user or software, when certain predefined events occur, when the policy engine detects dynamic conditions that warrant running the assessments 210, or when commands via a network or other communications mechanisms direct an assessment 210 to be performed.

The policy engine 230 can run one, some, or all of the assessments 210 based on the command. Each assessment 210, when run, can be performed in a parameterized fashion (i.e., the assessment 210 is not fixed but may be determined by the policy engine 230 using information from the policy data 220, the data store 240 or from software 250, or the operating system (OS) 270 directly or via the application program interface (API) 260). Such information could also derive from a user or other external source such as a network or other communications mechanism.

There may be a plurality of assessments 210—five are shown in FIG. 2. The assessments 210 shown in FIG. 2 only represent exemplary assessments, and they do not represent the full scope of the assessments that can be used in the present invention. The assessments 210 gather information on computing products or components. The assessments 210 may return data describing the product's attributes, capabilities, and features as defined above. The assessment tool may use any number of techniques to gather the data such as measuring, enumerating, and/or detecting. The assessments 210 may use other software components such as drivers, middleware, the operating system 270 itself, or other applications that may interface directly with hardware to collect the data.

Once an assessment 210 is performed, the policy engine 230 can store the assessment data in a data store 240 that can be accessed directly by software 250 or via the API 260. Software components 250 can request assessments 210 be made and otherwise control the operation of the assessments 210 via the API 260. Such data could also be made available to other outside systems or applications, for example, a software package 280 via a network connection or other communication mechanisms. Further, the policy engine 230 can also take the discrete data generated by the assessments 210 from the data store 240 and use a decision tree, matrix or other form of data to aggregate, average or otherwise transform the discrete data into another form. Such data can be subsequently saved back in the data store 240. Software 250 can access this aggregated or transformed data directly from the data store 240 or via an API 260.

Software 250 can request assessments be made and otherwise control the operation of the assessments via the API 260 and the policy engine 230. The policy engine 230 can also control access to the policy data 220 and the data store 240 providing mechanisms to read, modify, add, and delete information in the policy data 220 and/or the data store 230.

Figure 3:
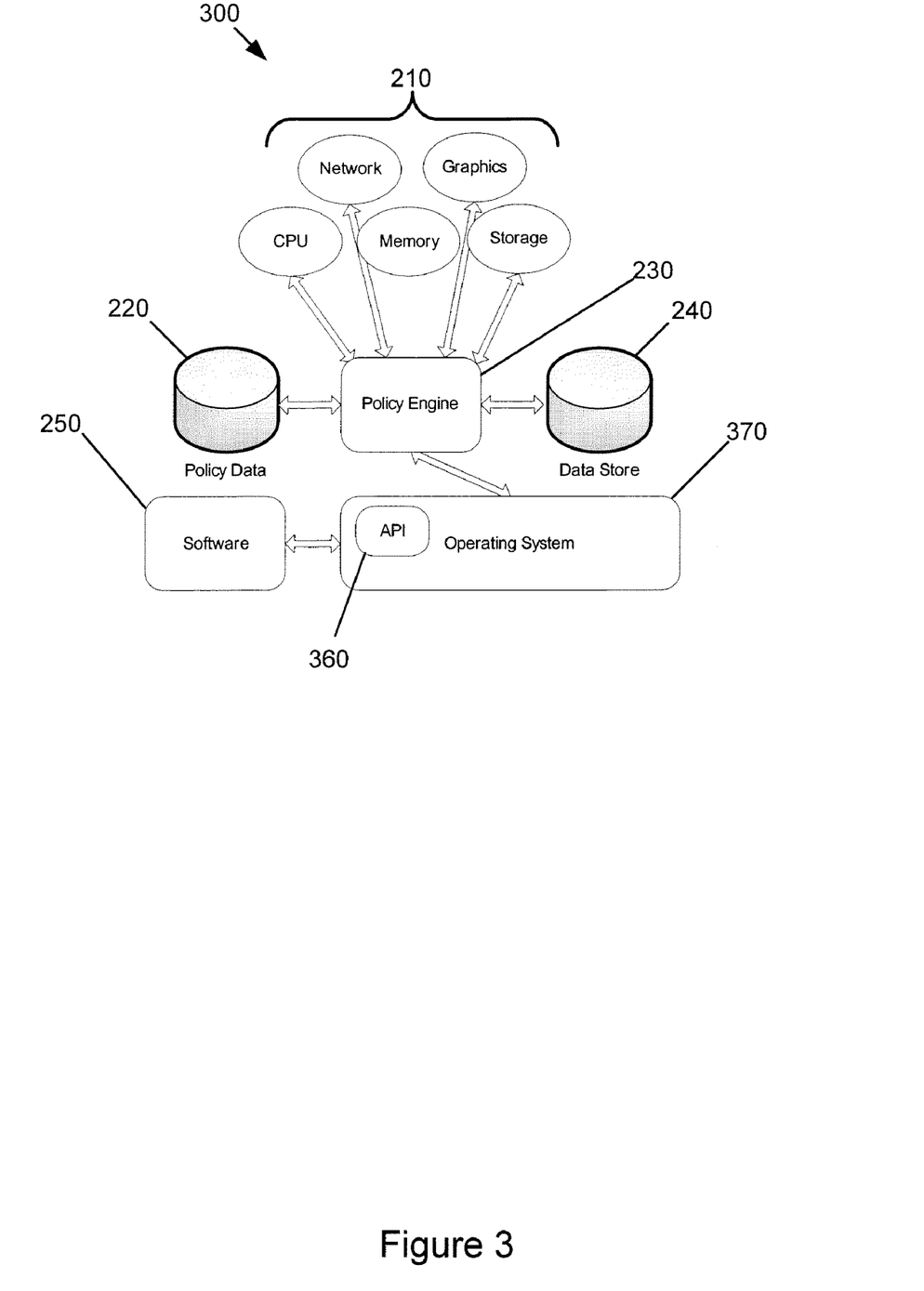
FIG. 3 is a block diagram of another exemplary computing environment that may be used for obtaining data for determining a computer system's attributes, capabilities, and features in accordance with the present invention.

FIG. 3 is a block diagram of another exemplary computing environment 300 using an assessment tool to obtain data for determination of a computer system's attributes, capabilities, and features in accordance with the present invention. FIG. 3 contains elements similar to those described above with respect to FIG. 2. These elements are labeled identically and their description is omitted for brevity. FIG. 3 functions substantially identical to the exemplary computing environment of FIG. 2, except the operating system 370 encompasses the API 360 in the exemplary computing environment 300.

Figure 4:
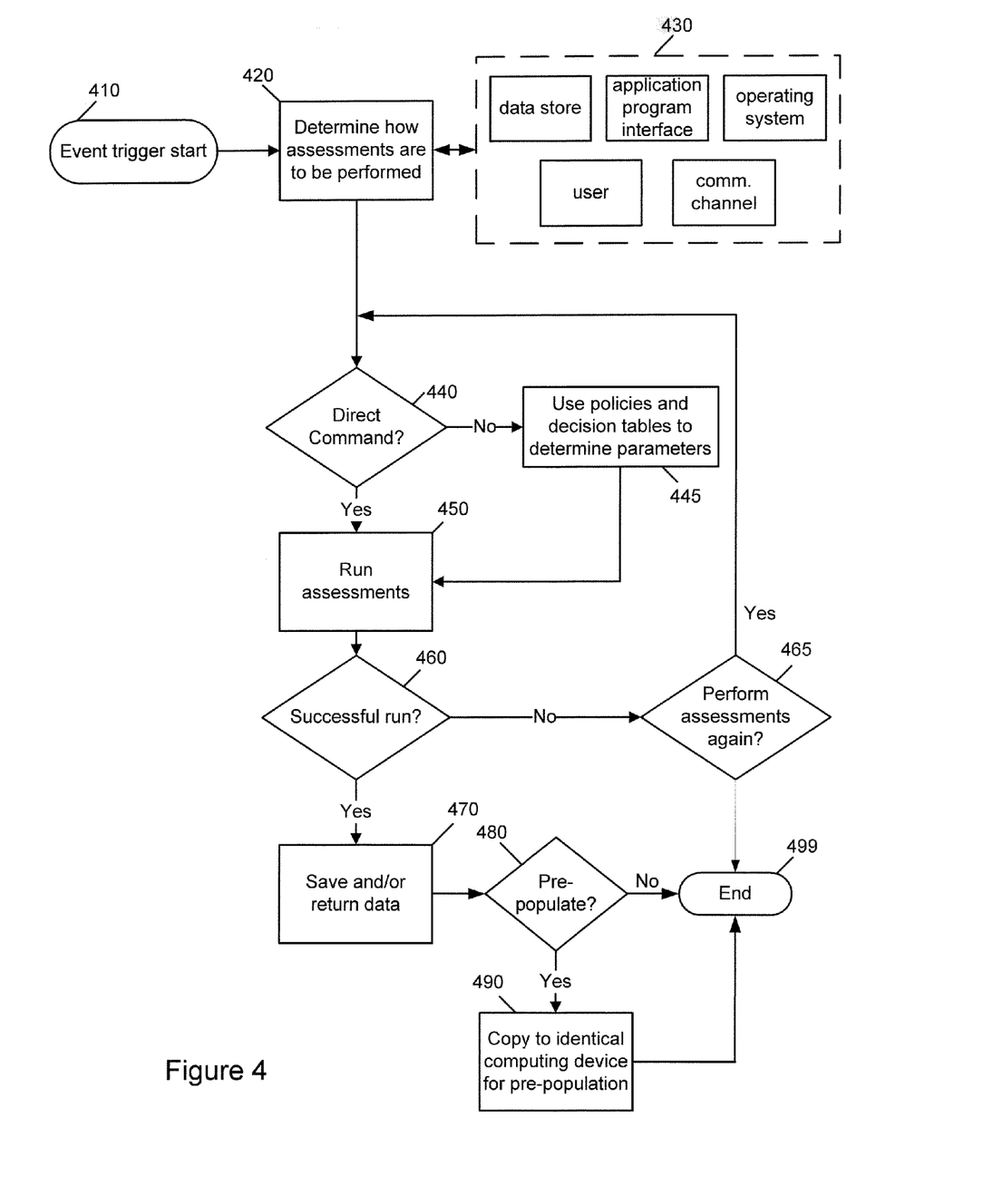
FIG. 4 is a flow diagram of an exemplary method for determining a computer system's attributes, capabilities, and features in accordance with the present invention.

FIG. 4 is a flow diagram of an exemplary method for determining a computer system's attributes, capabilities, and features in accordance with the present invention. The process begins with an event trigger 410 that can include, but is not limited to, a user requesting performance of an assessment, the operating system requesting performance of an assessment, and a software program requesting performance of an assessment.

At step 420, assessment tool determines how the assessments are to be performed by reviewing the protocol set by, for example, the data store, the API, the OS, the user, and the communications channel at step 430. The assessment considers whether there was a direct command requesting the assessment at step 440.

If there was a direct command at step 440, then the tool will run the assessments at step 450 in accordance with the direct command. Once the assessments are completed, the assessment tool determines if the assessments were successfully completed at step 460. If the assessments were successfully completed at step 460, then the assessment data can be either saved or reported/returned at step 470. At step 480, the assessment tool determines whether the data was requested to pre-populate other computing products. If the assessment data was determined for pre-population, then the assessment data will be copied to other identical products and saved locally at 490. The assessment method then concludes at step 499. If it is determined that the assessment data was not requested for pre-population at step 480, the method concludes at step 499.

If the assessment command was not a direct command at step 440, then the assessment tool will use policies and decision tables to determine the parameters for running the assessment at step 445. Subsequent to using the policies and decision tables at step 445, the assessment tool will continue with the assessments at step 450. If the assessments are not successfully completed at step 460, the assessment tool, based on predetermined factors, or the user, based on preference, decides whether to perform the assessments again at step 465. If the assessment tool, based on predetermined factors, or the user based on preference, decides to run the assessments again at step 465, the process restarts with the determination of whether there was a direct command requesting the assessment at step 440. If the assessment tool, based on predetermined factors, or the user based on preference, decides not to run the assessments again at step 465, the process concludes at step 499.

Figure 5:
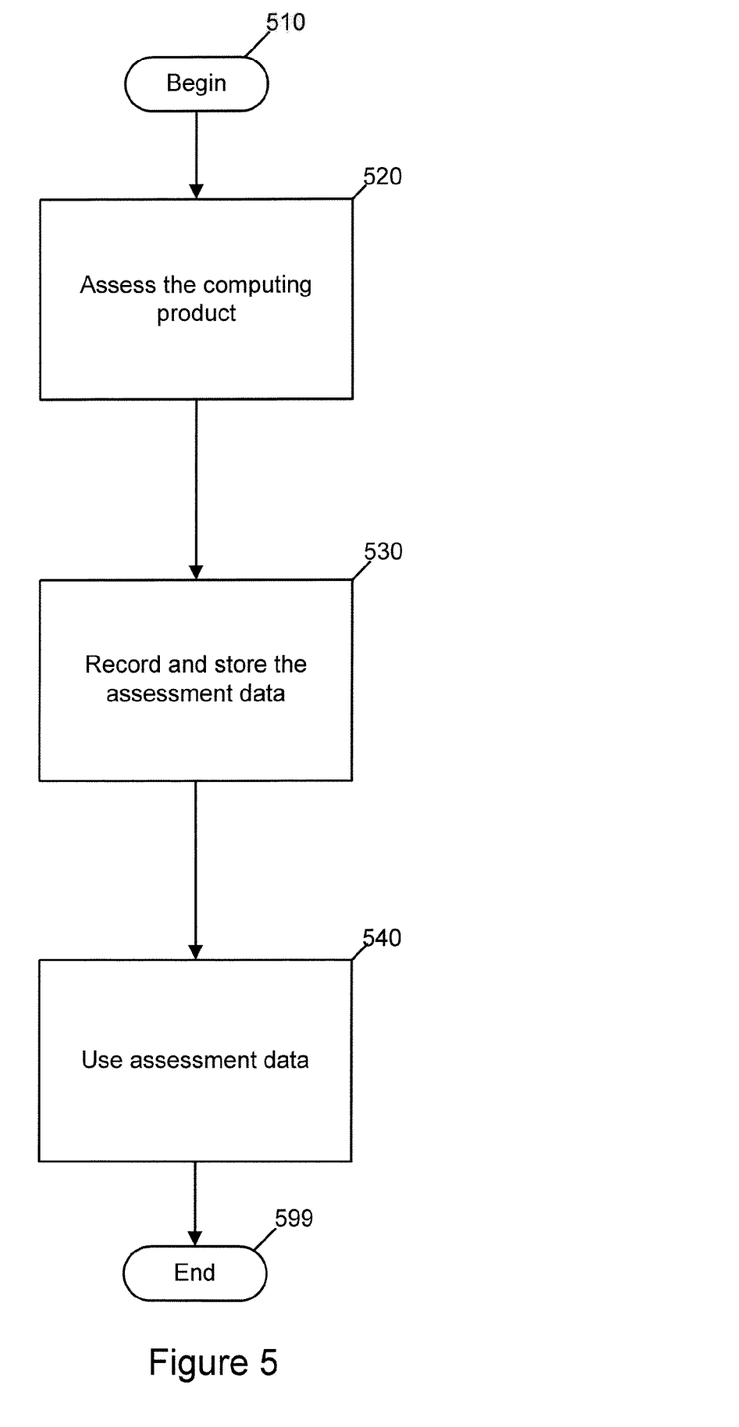
FIG. 5 is a flow diagram of an exemplary method for assessing a computer product and using the assessment data in accordance with the present invention.

FIG. 5 is a flow diagram of an exemplary method for assessing a computer product and using the assessment data in accordance with the present invention. The method begins at step 510 which may occur, for example, based on a triggering of the method. Exemplary triggers include user direction, software requests, or some other triggering factor. The assessment tool performs an assessment of the computing product at step 520. The assessments can include determining the attributes, capabilities, and features of the computing product.

Once the assessments are performed at step 520, the assessment data is recorded and stored at step 530. The data may be stored, for example, in a data store. The stored assessment data can then be used subsequently at step 540 by, for example, an operation system attempting to evaluate system compatibility. The stored assessment data can also be used for pre-population of other identical computing products. Further, the stored assessment data can be input into a capability rating system or tool to determine a rating of a particular computing device. The stored assessment data also can be used by software or the operating system to warn users when they attempt to run applications or open files that the computing device may not be able to support.

Figure 6:
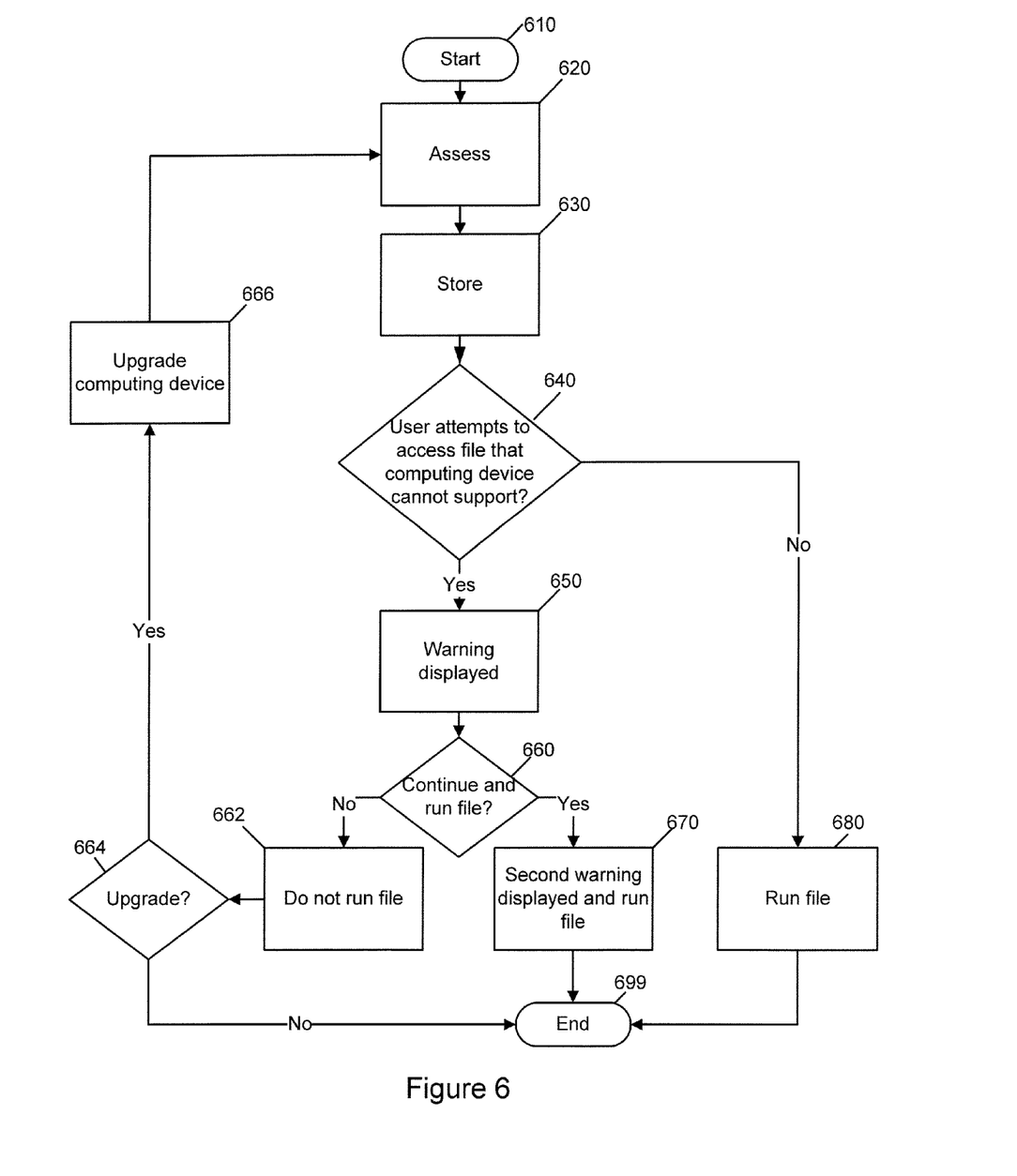
FIG. 6 is a flow diagram of an exemplary method for utilizing assessment data of a computer product when attempting to access software in accordance with the present invention.

FIG. 6 is a flow diagram of an exemplary method for utilizing assessment data of a computer product when attempting to access software in accordance with the present invention. At step 610, method begins based on a trigger. The assessment tool performs an assessment of the computing product at step 620. The assessments can include determining the attributes, capabilities, and features of the computing product. Once the assessments are performed at step 620, the assessment data is recorded and stored at step 630.

Subsequently, a user may attempt to, for example, open a file. At step 640, the computing product determines whether it supports the file. If the computing product can support the file, then at step 680 the file is run and the method concludes at step 699. If, however, the computing product cannot support the file, then at step 650 a warning is displayed or otherwise indicated or provided, and at step 660 the user decides whether to continue and run the file or whether to abort the action. If the user decides to continue with the opening of the file at step 660, a second warning is displayed and the computing product will attempt to run the file at step 670. The method then concludes at step 699.

If the user decides not to continue with the opening of the file at step 660, then the file is aborted at 662. The user is desirably given the opportunity to upgrade the computing product at step 664. If the user does not wish to upgrade at step 664, the method concludes at step 699. If the user does wish to upgrade at 664, then the computing device is upgraded at step 666. Upgrades may be performed subject to payment or other consideration being provided to a software provider, for example. After the computing product is upgraded at step 666, the computing device is again assessed at step 620 and new assessment data is recorded and stored at step 630. With the new upgrade from step 666, the computing product should determine that it supports the file at step 640, and therefore run the file at step 680 and conclude at step 699.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the versioning functionality of the present invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A method for performing a computing system assessment to determine at least one performance characteristic of the computing system, comprising:
   storing policy data, the policy data specifying information as to when to perform the computing system assessment or a method to perform the computing system assessment, the computing system assessment comprising a computing system attribute, a computing system capability or a computing system feature;
   receiving a request to perform the computing system assessment on the computing system;
   if the request is a direct command:
      performing the computing system assessment in accordance with at least one parameter specified in the direct command to generate computing system assessment data;
   if the request is not a direct command:
      performing the computing system assessment in accordance with the policy data to generate computing system assessment data;
   storing the computing system assessment data;
   copying the computing system assessment data to at least one identical computing system when the request indicates a pre-population operation; and
   upon an event requiring at least one of a computing system attribute, computing system capability or computing system feature, if the at least one computing system attribute, computing system capability or computing system feature is not supported as determined by the computing system assessment data, providing a warning that the at least one computing system attribute, computing system capability or computing system feature is not supported.

2. The method of claim 1, wherein the computing system is a single computing device.

3. The method of claim 1, wherein the computing system is a server.

4. The method of claim 1, wherein the computing system is a cluster of computing devices.

5. The method of claim 1, further comprising generating a compatibility rating for the computing system based on computing system the assessment data.

6. The method of claim 1, further comprising determining how to perform computing system assessments based on at least one of a plurality of factors comprising information from a data store, an application program interface, an operating system, a user, and a communications channel.

7. A computer readable medium having stored thereon computer-executable instructions for performing a method for performing a computing system-assessment to determine at least one performance characteristic of the computing system comprising:
   storing policy data, the policy data specifying information as to when to perform the computing system assessment or a method to perform the computing system assessment, the computing system assessment comprising a computing system attribute, a computing system capability or a computing system feature;
   receiving a request to perform the computing system assessment on the computing system;
   if the request is a direct command:
      performing the computing system assessment in accordance with at least one parameter specified in the direct command to generate computing system assessment data;
   if the request is not a direct command:
      performing the computing system assessment in accordance with the policy data to generate the computing system assessment data;
   storing the computing system assessment data;
   copying the computing system assessment data to at least one identical computing system when the request indicates a pre-population operation; and
   upon an event requiring at least one of a computing system attribute, computing system capability or computing system feature, if the at least one computing system attribute, computing system capability or computing system feature is not supported as determined by the computing system assessment data, providing a warning that the at least one computing system attribute, computing system capability or computing system feature is not supported.

8. The computer readable medium of claim 7, wherein the method further comprises generating a compatibility rating for the computing system based on the computing system assessment data.

9. The computer readable medium of claim 7, wherein the method further comprises determining how to perform computing system assessments based on at least one of a plurality of factors comprising information from a data store, an application program interface, an operating system, a user, and a communications channel.

10. A system for performing a computing system assessment to determine at least one performance characteristic of the computing system comprising:
   a processor operative to execute computer-executable instructions; and
   memory having stored therein computer-executable instructions for performing steps comprising:
      storing policy data, the policy data specifying information as to when to perform the computing system assessment or a method to perform the computing system assessment, the computing system assessment comprising a computing system attribute, a computing system capability or a computing system feature;
      receiving a request to perform the computing system assessment on the computing system;
      if the request is a direct command:
         performing the computing system assessment in accordance with at least one parameter specified in the direct command to generate computing system assessment data;
      if the request is not a direct command:
         performing the computing system assessment in accordance with the policy data to generate computing system assessment data;
      storing the computing system assessment data;
      copying the computing system assessment data to at least one identical computing system when the request indicates a pre-population operation; and
      upon an event requiring at least one of a computing system attribute, computing system capability or computing system feature, if the at least one computing system attribute, computing system capability or computing system feature is not supported as determined by the computing system assessment data, providing a warning that the at least one computing system attribute, computing system capability or computing system feature is not supported.

11. The system of claim 10, wherein the steps further comprise generating a compatibility rating for the computing system based on the computing system assessment data.

12. The system of claim 10, wherein the steps further comprise determining how to perform computing system assessments based on at least one of a plurality of factors comprising information from a data store, an application program interface, an operating system, a user, and a communications channel.

* * * * *